(12) United States Patent
Kagami

(10) Patent No.: US 7,605,951 B2
(45) Date of Patent: Oct. 20, 2009

(54) IMAGE READER, IMAGE FORMING AND REPRODUCING APPARATUS, AND IMAGE READING METHOD

(75) Inventor: Yoshinobu Kagami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1049 days.

(21) Appl. No.: 11/051,001

(22) Filed: Feb. 7, 2005

(65) Prior Publication Data

US 2005/0254102 A1  Nov. 17, 2005

(30) Foreign Application Priority Data

Feb. 10, 2004 (JP) .............................. 2004-033632
Jun. 30, 2004 (JP) .............................. 2004-193776

(51) Int. Cl.
H04N 1/40 (2006.01)
H04N 1/00 (2006.01)

(52) U.S. Cl. .................................. 358/447; 358/406

(58) Field of Classification Search .................. 348/47, 348/48, 687; 358/474, 475, 500, 509, 504, 358/510, 512, 513, 520, 521, 530, 447
See application file for complete search history.

(56) References Cited

U.S. PATENT DOCUMENTS

| | | | | |
|---|---|---|---|---|
| 6,650,443 B1 * | 11/2003 | Izumi | ........................ | 358/475 |
| 6,717,617 B1 * | 4/2004 | Ozono | ........................ | 348/324 |
| 6,867,885 B2 * | 3/2005 | Inage | ........................ | 358/443 |
| 6,897,987 B2 * | 5/2005 | Nakamura et al. | .......... | 358/474 |
| 7,023,591 B2 * | 4/2006 | Hokoi | ........................ | 358/506 |
| 2001/0030770 A1 | 10/2001 | Ohashi | | |
| 2002/0030803 A1 * | 3/2002 | Tabata et al. | .................. | 355/68 |
| 2004/0156563 A1 * | 8/2004 | Shiomi | ........................ | 382/312 |
| 2005/0063026 A1 * | 3/2005 | Weldy et al. | ................. | 358/504 |
| 2005/0078886 A1 * | 4/2005 | Yushiya et al. | ............... | 382/312 |
| 2006/0256398 A1 * | 11/2006 | Ishimaru et al. | ............. | 358/461 |

FOREIGN PATENT DOCUMENTS

| | | |
|---|---|---|
| JP | 01-228267 | 9/1989 |
| JP | 02-192365 | 7/1990 |
| JP | 6-169377 | 6/1994 |
| JP | 6-311363 | 11/1994 |
| JP | 11-215298 | 8/1999 |
| JP | 2000-188686 | 7/2000 |
| JP | 2001-211297 | 8/2001 |
| JP | 2001-346012 | 12/2001 |
| JP | 2002-158837 | 5/2002 |
| JP | 2002-218186 | 8/2002 |

* cited by examiner

Primary Examiner—Jerome Grant, II
(74) Attorney, Agent, or Firm—Oblon, Spivak, McClelland, Maier & Neustadt, L.L.P.

(57) ABSTRACT

An image reader comprises an image sensor configured to receive a light beam reflected from an original to be read and output an analog pixel signal corresponding to a light quantity of the received light beam; a variable-gain amplifier configured to amplify the analog pixel signal to a prescribed level; an analog-to-digital converter configured to convert the amplifier analog pixel signal to digital image data; and correction means for performing correction on the A/D converted digital image data according to a prescribed criterion, using a data value corresponding to an original level of the analog pixel signal before the amplification.

33 Claims, 15 Drawing Sheets

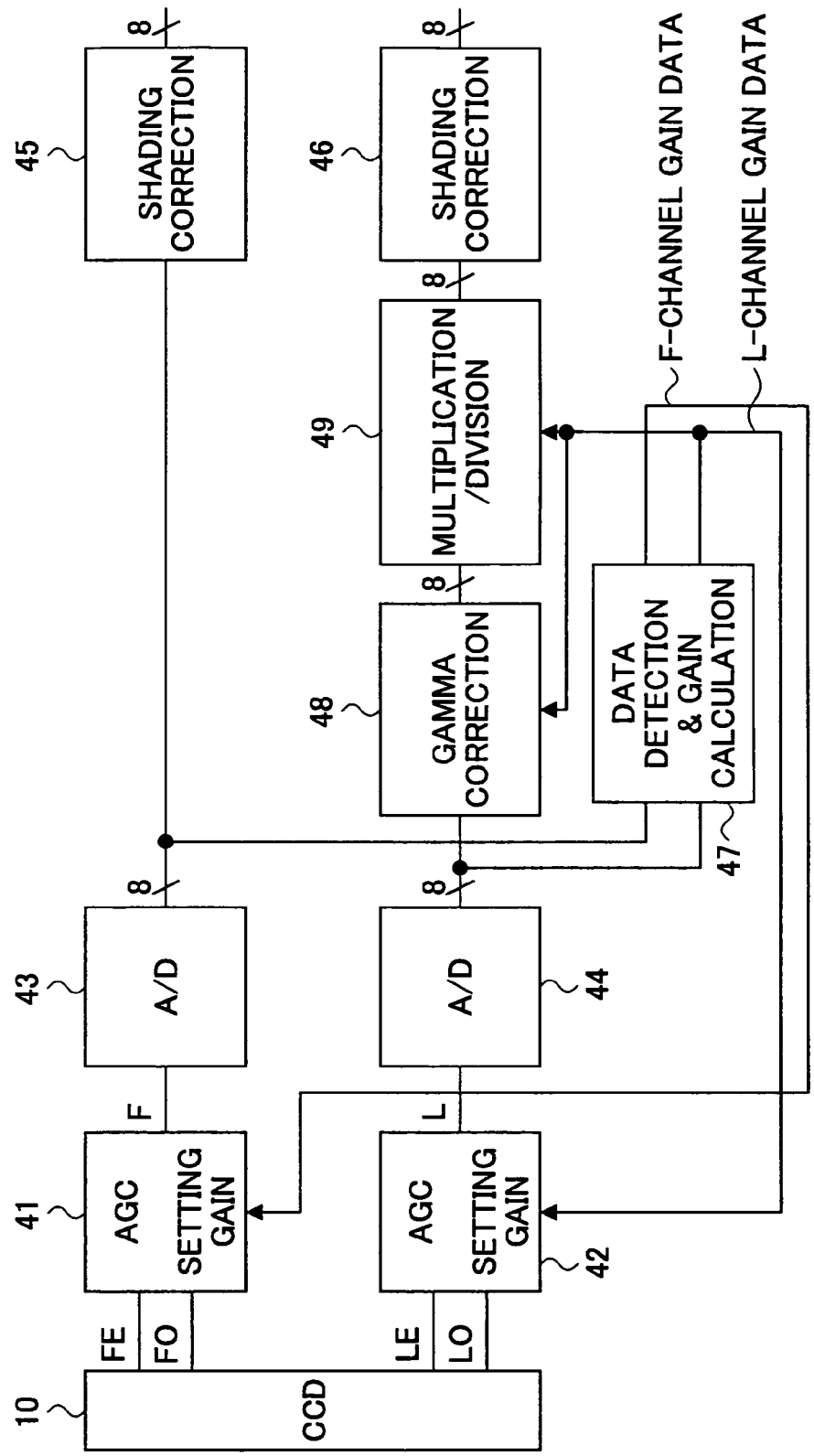

IMAGE READER, IMAGE FORMING AND REPRODUCING APPARATUS, AND IMAGE READING METHOD

BACKGROUND OF THE INVENTION

1. Field of the Invention

The present invention generally relates to an image reading technique and an image forming and reproducing apparatus using an image reader, and more particularly, to an image reader using an image sensor that groups analog pixel signals representing sensed light quantities into at least two parts (the first part and the last part) in the fast scan direction and outputs the grouped signals in different channels.

2. Description of Related Art

A linear image sensor is generally used in an image reader of a digital copier or a facsimile machine, or in an image scanner. A conventional CCD linear image sensor is configured to output odd-number pixel data and even-number pixel data alternately, dividing output signals into an odd channel and an even channel. The image reading speed is increased by providing a combination of such an ODD/EVEN 2-channel image sensor and an analog signal processor to process the two lines of analog pixel signals output from the image sensor in parallel.

However, needs for image readers capable of faster reading operations are now arising, and therefore, it is required to further improve the reading speed over the conventional ODD/EVEN 2-channel image sensor.

In response to this demand, a 4-channel output image reader that quarters the pixel frequency to realize double the reading speed of the conventional ODD/EVEN 2-channel output image sensor is proposed. With the 4-channel output image reader, each line of light-receiving elements (or light-to-electric converting elements) is divided at the center into the first part and the last part in the fast scan direction, in addition to the grouping of odd-number pixels and even-number pixels. Thus, the entire pixels are divided into four groups, and the sensed signals are output through four channels. This type of image sensor is referred to as an FL-type image sensor, and disclosed in, for example, Japanese Patent Laid-Open Publication Nos. 11-215298A and 2002-158837A.

In the image reader using a 4-channel output image sensor, if a level difference remains between the left-region scanning signal and the right-region scanning signal due to a slight difference in linearity characteristics of the output signals on the four channels, the image quality may differ between the left part and the right part divided by the FL boundary position. Signal level difference occurring between the odd-number pixels and the even-number pixels of a conventional ODD/EVEN 2-channel is not so serious because only a very minute repeated pattern is added to the reproduced image. Such a slight variation in the fine and repeated pattern does not influence the image quality very much. In contrast, if a slight amount of signal level difference is generated between the left half and the right half of the image, such a small level difference will result in conspicuous image degradation.

To overcome this problem, Japanese Patent Laid-Open Publication No. 2002-218186 proposes a technique for bringing the signal levels of the F-channels and the L-channels of a 4-channel output image sensor in agreement with each other by performing analog-to-digital conversion and shading correction for each of the first-part even-pixel (FE) group, the first-part odd-pixel (FO) group, the last-part even-pixel (LE) group, and the last-part odd-pixel (LO) group, independently, and by further performing gamma correction on the corrected data using a lookup table.

FIG. 1 is a block diagram of a conventional image reader that performs the above-described image correction. The image reader includes a CCD 101, which functions as the 4-channel output image sensor configured to output analog pixel signals through the FE, FO, LE, and LO channels in parallel. The FE channel and the FO channel are connected to the associated analog processing LSI circuit 102. The LE channel and the LO channel are connected to the associated analog processing LSI circuit 103. The data of each channel are amplified to a prescribed level under automatic gain control (AGC) of the amplifier at the associated analog processing circuit 102 or 103. Then, the data items on the even channel and the odd channel are combined and rearranged in a time-series signal sequence using a multiplexer, and subjected to other necessary analog signal processing. Then, the first-part (F-channel) data and the last-part (L-channel) data are supplied to the associated analog-to-digital converters 104 and 105, respectively, and converted into digital form. The digitized F-channel data and L-channel data are subjected to shading correction at the shading correction circuits 106 and 107, respectively, which circuits 106 and 107 are structured by memories and arithmetic components. Then, the F-channel and L-channel digital data items are supplied to pixel rearrangement means (not shown), and combined and rearranged in a time-series signal sequence. The combined signal is output from the image reader after necessary image processing.

The gains of the amplifiers of the analog processing circuits 102 and 103 are adjusted automatically, by detecting the levels of the digital data items output from the A/D converters 104 and 105 and calculating the corresponding gains at the calculation unit 108. The calculated gains are fed back to the analog processing LSI circuits 102 and 103, respectively, so as to perform automatic gain control.

A gamma correction table 109 is provided to one of the F-channel and L-channel digital data paths so as to bring the linearity characteristic of the digital data item of one channel into agreement with that of the other channel. In FIG. 1, gamma correction is performed on the L-channel. Thus, the first-part odd and even analog signals and the last-part odd and even analog signals are amplified by the amplifiers of the analog processing circuits 102 and 103, respectively, to a prescribed level, and converted to a digital form at the A/D converters 104 and 105, respectively. After the shading correction at the shading correction circuits 106 and 107, gamma correction is performed at the gamma correction table 109 so as to make the linearity characteristics of the F-channel and L-channel digital data items consistent with each other.

Difference between the even-pixel group and the odd-pixel group, and difference between the first-part group and the last-part group may occur due to variation in the signal processing circuits. However, the major factor of such differences resides in variation in the linearity characteristic of the output signal itself from the CCD 101. The linearity characteristic represents the analog output (scanner output) with respect to the incident light quantity of the CCD 101. Since the analog output is in proportion to the light quantity, it should become linear, logically. However, in the actual operation, the analog output may not be linear, as illustrated in FIG. 2, and there may be difference in linearity characteristic between the F-channel data and the L-channel data.

In view of the linearity difference in the actual operation, the conventional difference correction method disclosed in, for example, 2002-218186 cannot follow the change in the CCD output, such as change in the incident light quantity over time. This is because the amplifiers used in the analog processing circuits 102 and 103 are AGC amplifiers, and because such amplifiers automatically amplify the input signals to a prescribed level regardless of the CCD output values. Analog-to-digital conversion and shading correction are performed on the uniformly amplified analog data, and then gamma correction is performed using the gamma correction table 109. The gamma correction table 109 is generally created under the initial condition of 100% light quantity. But such a factory default gamma correction table 109 may be used as it is under the lowered light quantity of, for example, 50%.

FIG. 3 is a block diagram of a conventional image reader with another structure. In FIG. 3, analog pixel signals are output from the CCD 201 through the FE, FO, LE, and LO channels in parallel. The FE channel and the FO channel are connected to the associated analog processing LSI circuit 202. The LE channel and the LO channel are connected to the associated analog processing LSI circuit 203. The data of each channel are amplified to a prescribed level under automatic gain control (AGC) of the amplifier at the associated analog processing circuit 202 or 203. Then, the data items on the even channel and the odd channel are combined and rearranged in a time-series signal sequence using a multiplexer, and subjected to other necessary analog signal processing. Then, gamma correction is performed on the digital data of one of the first-part and last-part channels (for example, the L-channel in the example shown in FIG. 3) so as to make the L-channel digital data consistent with the F-channel digital data, using a lookup table 206 formed by a ROM in which the gamma correction data are written. Then, the F-channel and L-channel digital data items are combined and rearranged in a time-series signal sequence at the pixel rearrangement LSI circuit 207, subjected to shading correction at the shading correction circuit 208, and output from the image reader.

The difference between the F-channel and the L-channel of the FL type CCD 201 is corrected by performing gamma correction on the digitized image data, using the lookup table 206. However, the gamma correction values may become inappropriate due to change over time in temperature or other factors, and the difference between the F-channel and the L-channel may becomes conspicuous even if the lookup table 206 is appropriately adjusted from the factory default initial condition. In this case, it is desired that the gamma correction values be readjusted by service persons or users; however, no countermeasures for this problem are addressed.

In addition, none of the above-listed publications describe the detailed process of acquiring output values of each area when reading multiple gray charts or interpolation among gray charts required during the creation of the lookup table. If there is a slight amount of level change occurring in output signals at the boundary between the first part and the last part, the level difference is perceived in the reproduced image. Since inappropriate calculation of the area output values or inappropriate interpolation will result in conspicuous image degradation, the conventional technique is insufficient to adjust the output levels of a 4-channel output image sensor.

SUMMARY OF THE INVENTION

Accordingly, it is an object of the present invention to appropriately perform necessary correction, such as linearity correction, on the A/D converted pixel data in an image reader using a 4-channel output image sensor even if the quantity of light incident on the CCD decreases.

It is another object of the invention to allow the output difference between different channels of the first-part pixel group and the last-part pixel group to be appropriately corrected by the end users.

To achieve the object, in one aspect of the invention, an image reader is provided, which includes:
(a) an image sensor configured to receive a light beam reflected from an original to be read and output as an analog pixel signal corresponding to a light quantity of the received light beam;
(b) a variable-gain amplifier configured to amplify the analog pixel signal to a prescribed level;
(c) an analog-to-digital converter configured to convert the amplified analog pixel signal to digital image data; and
(d) correction means for performing correction on the A/D converted digital image data according to a prescribed criterion, using a data value corresponding to an original level of the analog pixel signal before the amplification.

In the preferred example, the correction according to the prescribed criterion is a linearity correction with reference to a target linearity characteristic.

Preferably, the correction means is configured to set the data value corresponding to the original level of the analog pixel signal before the amplification, based on a gain of the amplifier.

The data value may be set so as to correspond to the original level of the analog pixel signal before the amplification by multiplying the A/D converted digital image data by the inverse of the gain of the amplifier.

Preferably, the correction means may further have converting means arranged after the correction table and performing a conversion process corresponding to the gain of the amplifier on the linearity corrected digital image data.

In another aspect of the invention, an image forming and reproducing apparatus comprising the above-described image reader configured to read an image from an original; and a printing unit configured to reproduce the image read by the image reader on a recording medium.

In still another aspect of the invention, an image reading method is provided, which method includes the steps of:
(a) receiving a light beam reflected from an original to be read at an image sensor and outputting an analog pixel signal corresponding to a light quantity of the received light beam;
(b) amplifying the analog pixel signal to a prescribed level using a variable-gain amplifier;
(c) converting the amplified analog pixel signal to digital image data; and
(d) performing correction on the A/D converted digital image data according to a prescribed criterion, using a data value corresponding to an original level of the analog pixel signal before the amplification.

In yet another aspect of the invention, an image reader includes:
(a) an image sensor configured to receive a light beam reflected from an original, divide analog pixel outputs generated based on a light-receiving quantity into a first-part analog pixel signal and a last-part analog pixel signal in a scan direction, and output the first-part analog pixel signal and the last-part analog pixel signal in first and second channels, respectively;
(b) an analog-to-digital converter provided to each of the first-part analog pixel signal and the last-part analog pixel signal and configured to convert the analog pixel signal to digital image data;

(c) a digital output level detection circuit configured to detect an output level of the digital image data of each of the first and second channels;

(d) a table creating circuit configured to compare the detected output level of the first channel with the output level of the second channel and create a correction table for correcting for an output level difference between the first and second channels based on the comparison result; and (e) a pixel rearrangement circuit configured to rearrange the digital image data of the first and second channels having been subjected to correction using the correction table into a time series signal sequence.

In yet another aspect of the invention, an image forming and reproducing apparatus that includes the above-described image reader is provided.

BRIEF DESCRIPTION OF THE DRAWINGS

Other objects, features, and advantages of the present invention will become more apparent from the following detailed description when read in conjunction with the accompanying drawings, in which:

FIG. 6 is a block diagram illustrating a part of the image reader according to the first embodiment of the invention;

DETAILED DESCRIPTION OF THE PREFERRED EMBODIMENT

The preferred embodiment of the present invention is now explained below in conjunction with attached drawings.

Figure 4:
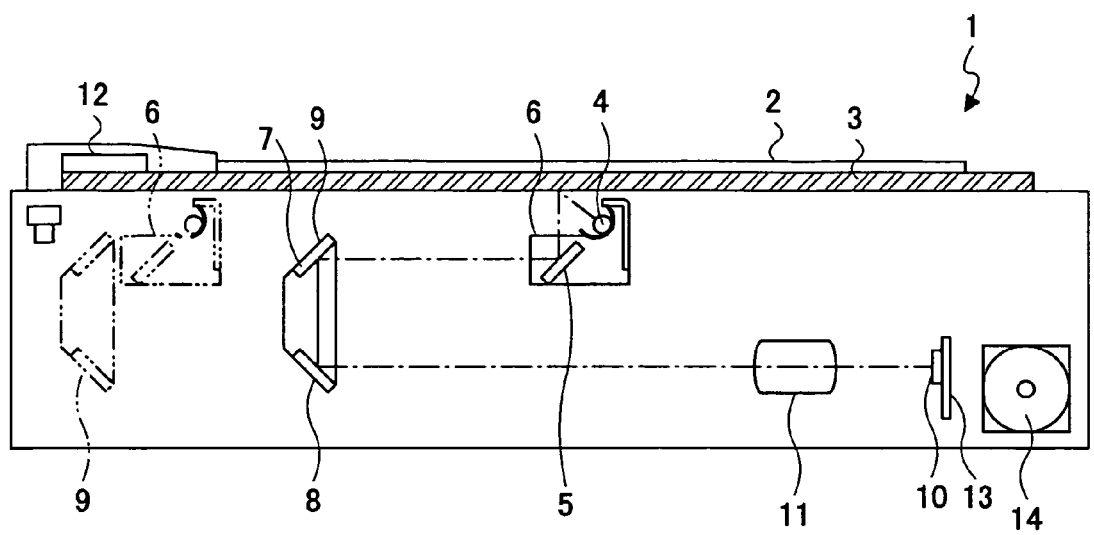
FIG. 4 is a schematic diagram illustrating in a side view an image reader according to an embodiment of the invention.

FIG. 4 is a schematic diagram illustrating in a side view an image reader 1 according to an embodiment of the invention.

The image reader 1 is of a flatbed type, and includes a contact glass 3 for supporting an original 2, a first carriage 6 mounting a halogen lamp (as a light source) 4 for illuminating the original 2 and a first reflecting mirror 5, a second carriage 9 mounting a second reflecting mirror 7 and a third reflecting mirror 8, a CCD linear image sensor 10 (referred to simply as a "CCD 10"), a lens unit 11 for focusing the light flux onto the CCD 10, a white reference plate 12 used for shading correction, and a stepping motor 14 for driving the first carriage 6 and the second carriage 9. The CCD 10 is provided on a sensor board 13. An optical scanning system is structured by the halogen lamp 4, the first through third reflecting mirrors 5, 7 and 8, and the lens unit 11.

The halogen lamp 4 emits light at a prescribed angle with respect to the white reference plate 12 and the scanned face of the contact glass 3. The light reflected from the white reference plate 12 or the original 2 is guided to the CCD 10 through the first through third reflecting mirrors 5, 7 and 8 and the lens unit 11. The CCD 10 generates a voltage corresponding to the incident light quantity and outputs an analog pixel signal. The first and second carriages 6 and 9 move in the slow scan direction, while maintaining the distance between the scanned face of the original 2 and the CCD 10, to expose the original 2 to the light.

Figure 5:
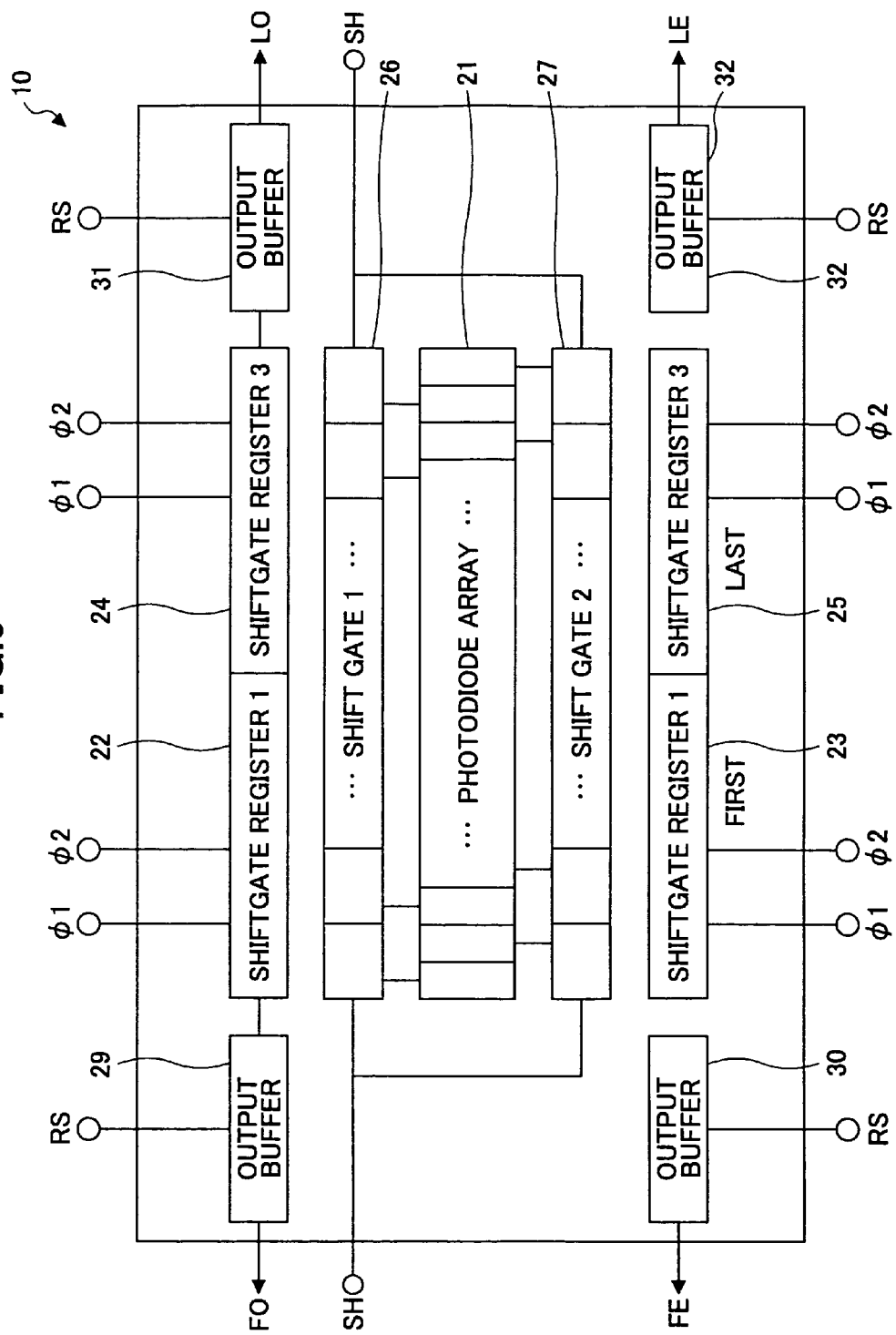
FIG. 5 is a schematic diagram illustrating the internal structure of an FL type CCD used in the image scanner.

As an example of the CCD 10, a 4-channel output image sensor (or an FL-type CCD) illustrated in FIG. 5 is used. FIG. 5 is a block diagram illustrating the internal structure of the FL-type CCD 10. The CCD 10 includes a photodiode array (pixel array) 21, in which a number of pixels are arranged so as to receive the light reflected from the original 2, and shiftgate registers 22-25 configured to successively read the electric charge accumulated in the pixels of the photodiode array 21 separately from the odd-number pixel group and the even-number pixel group and from the first half and the last half in opposite directions. Shift gates 26 and 27 are inserted between the photodiode array 21 and the shiftgate registers 22-25. Output amplifiers (or output buffers) 29-32 are provided corresponding to the shiftgate registers 22-25, respectively, so as to convert the electric charge levels read from the shiftgate registers 22-25 to electric signals. The output terminals of the output amplifiers 29-32 correspond to the four output channels of the image sensor (CCD 10).

By using the four shiftgate registers 22-25 in the CCD 10, electric charges accumulated in the pixels of the photodiode array 21 are divided into the first part and the last part in the fast scan direction at the center of the scanning range, and read from an odd-number pixel and an even-number pixel alternately. To be more precise, the electric charge is read starting from the head of the pixel line in the first part of the pixel array, while the electric charge is read starting from the end of the pixel line in the last part of the pixel array.

In FIG. 5, signal SH is a charge shift pulse used to control the shift gates 26 and 27 so as to shift the electric charge accumulated in the photodiode array 21 to the shiftgate registers 22-25 all at once. Signals φ1 and φ2 are charge transfer pulses for driving the shiftgate registers 22-25 so as to output the electric charge collectively shifted from the photodiode array 21 based upon the charge shift pulse SH to the associated output amplifiers 29-32 pixel by pixel. As a result, analog image signals are output on four channels of FO, FE, LO and LE.

FIG. 6 is a block diagram illustrating a part of the image reader using the CCD 10 shown in FIG. 5. In FIG. 6, only the blocks performing processes up to shading correction are illustrated. The CCD 10 is a 4-channel output image sensor for outputting analog pixel signals in parallel on FE, FO, LE, and LO channels. The FE channel and the FO channel are paired and input to the analog processing LSI circuit 41. The LE channel and the LO channel are paired and input to the analog processing LSI circuit 42. The analog pixel signal on each channel is amplified to a prescribed level by the amplifier provided in each of the analog processing circuits 41 and 42 under automatic gain control (AGC). Then, the even-pixel analog signals and the odd-pixel analog signals are combined and rearranged in a time-series signal sequence using a multiplexer or a suitable device in each of the first-part group and the last-part group. Other necessary signal processing is also performed at each of the analog processing circuits 41 and 42. Then, the first-part analog pixel signal sequence F and the last-part analog pixel signal sequence L are input to the analog-to-digital converters 43 and 44, respectively, and converted into digital pixel data.

The F-channel and L-channel digital pixel data are to be subjected to shading correction at shading correction circuits 45 and 46, respectively, which circuits are structured by memories and arithmetic components. Then, the two channels of digital data are supplied to pixel rearrangement means (not shown) and combined into a time-series signal sequence. The signal sequence is further subjected to necessary image processing (such as MTRF correction), and output from the image reader 1.

The gains of the amplifiers of the analog processing circuit 41 and 42 are automatically adjusted (under AGC) by detecting the levels of the A/D converted digital data items output from the A/D converters 43 and 44 and by calculating the corresponding gains at the arithmetic processing unit 47.

One of the digital data channels, for example, the L-channel digital image data output from the A/D converter 44, is subjected to gamma correction in order to bring the linearity characteristic consistent with that of the other channel digital data (the F-channel digital image data in this example). To this end, a gamma correction table 48 is provided after the A/D converter 44 on the L-channel data path. In addition, a multiplier/divider circuit (converting means) 49 is inserted after the gamma correction table 48. The gamma correction table 48 and the multiplier/divider circuit 49 form correction means. The gain of the amplifier of the L-channel analog processing circuit 42 calculated by the arithmetic processing unit 47 is input to the gamma correction table 48 and the multiplier/divider circuit 49, so as to allow the gamma correction table 48 and the multiplier/divider circuit 49 to perform data value conversion on the digital image data according to the gain.

For example, in the gamma correction table 48, the digital image data immediately after the A/D conversion by the A/D converter 44 are multiplied by the inverse of the gain to be used as the input data, on which gamma correction is to be performed. The multiplier/divider circuit 49 multiplies the gamma corrected digital image data by the gain (or divides the gamma corrected digital image data by the inverse of the gain).

Although not shown in the figure, digital components, such as the gamma correction table 48, the multiplier/divider circuit 49, and the shading correction circuits 45 and 46, are connected to and controlled by a CPU. Analog components, such as the A/D converters 43 and 44 and the former components, are connected to a timing controller (not shown), which controller controls connection timing to the CPU.

Figure 1:
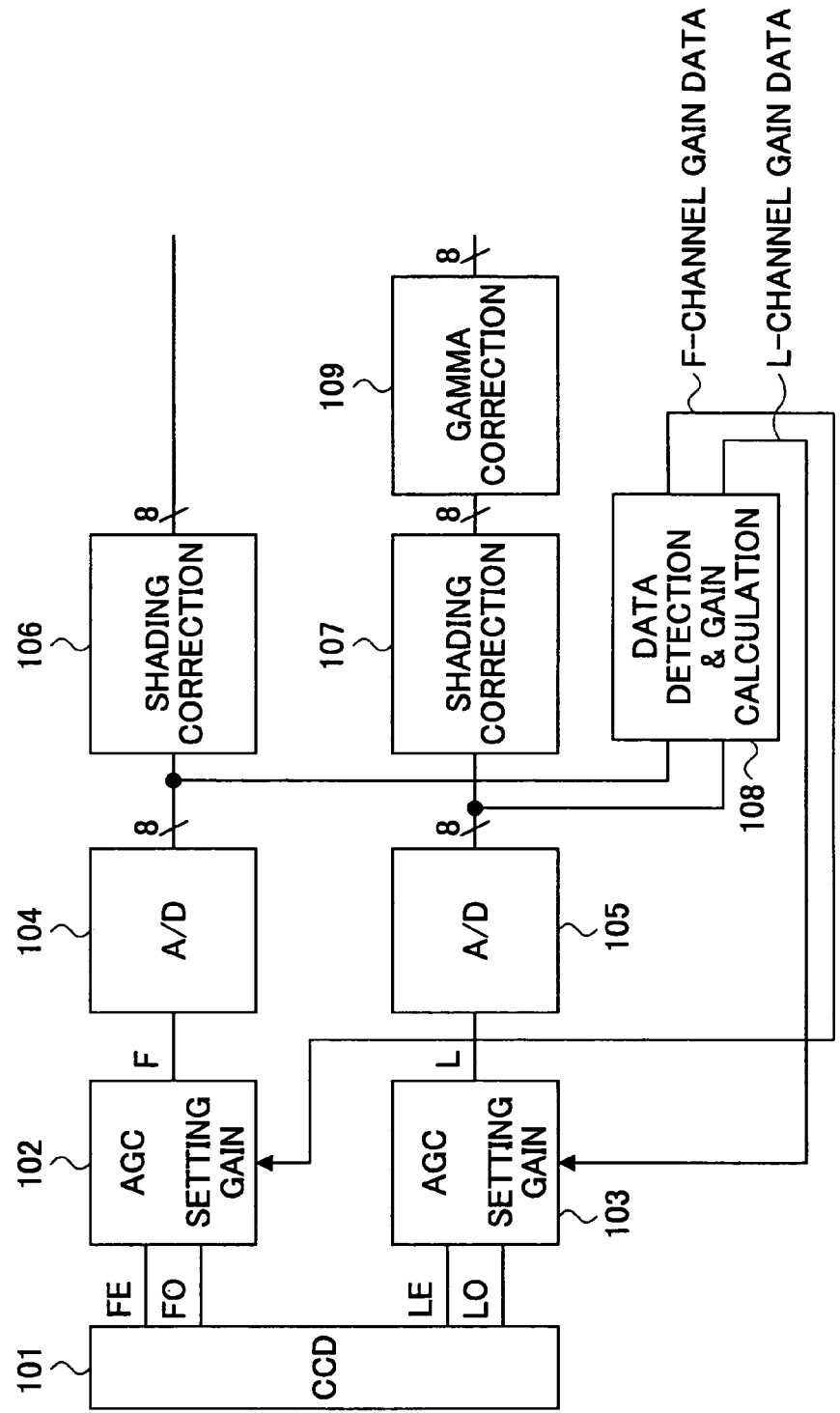
FIG. 1 is a block diagram illustrating a part of a conventional image reader using a 4-channel output image sensor.

This arrangement is advantageous over the conventional image reader shown in FIG. 1. In both the conventional structure and the first embodiment, the gains of the analog processing circuits 41 and 42 (102 and 103) are automatically controlled (under AGC) by detecting the levels of the A/D converted digital image data at the arithmetic processing unit 47 (108). In the actual operation, when the image reader is powered on, the white reference plate 12, which is also used in shading correction, is scanned, and the gains of the amplifiers provided to the four channels of FE, FO, LE, and LO are adjusted so as to bring the analog voltage levels of the reference color (white) on the four channels into a prescribed level. If the A/D converted data are 8-bit data, and if the white reference plate 12 has reflectance of 90%, then the gain of each amplifier is adjusted such that the reference level (white level) becomes 240/255.

Figure 2:
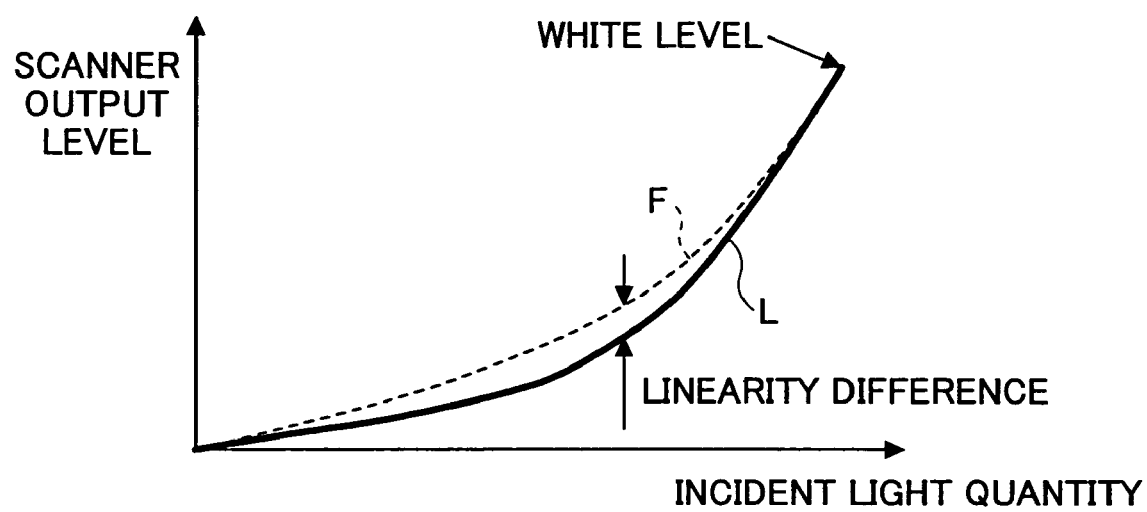
FIG. 2 is a graph showing an example of the difference between the F-channel output level and the L-channel output level in the conventional image reader.
Figure 3:
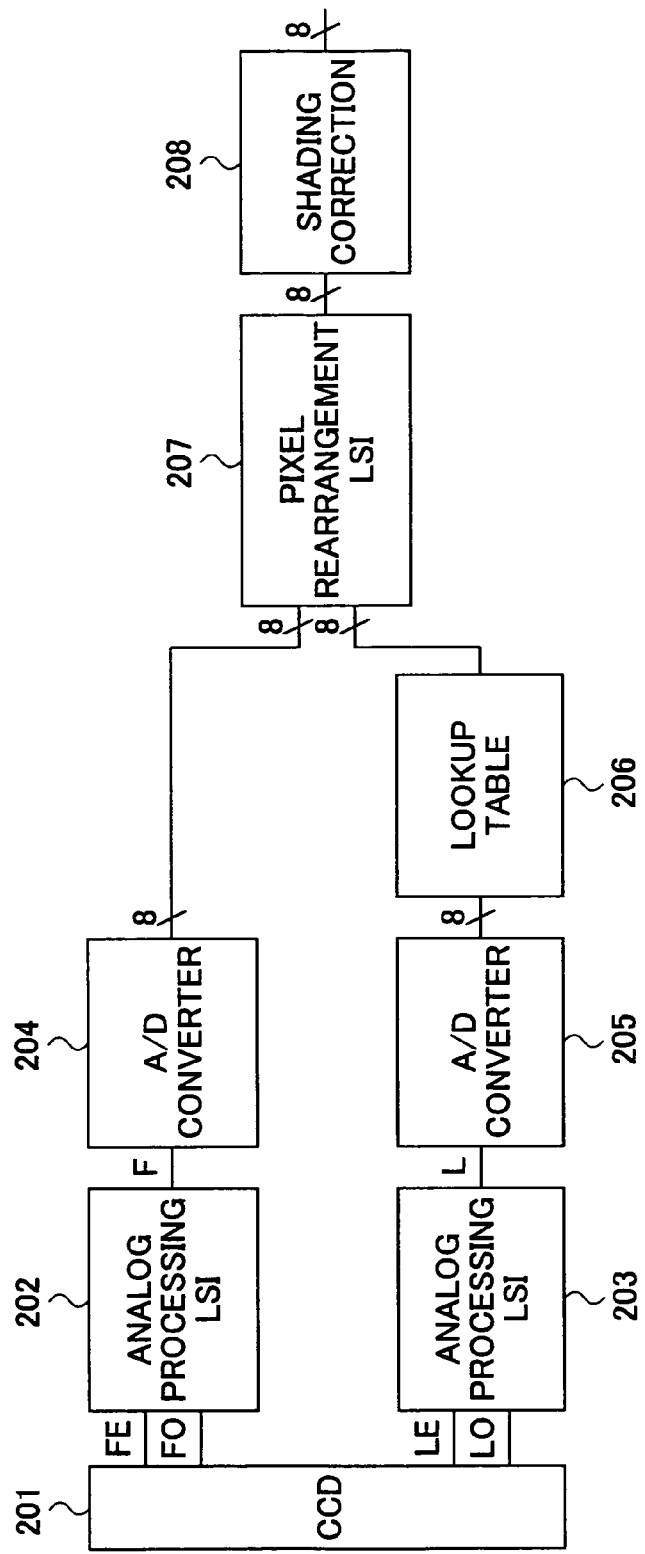
FIG. 3 is a block diagram illustrating a part of a conventional image reader using a 4-channel output image sensor.

Because of the automatic gain control (AGC), the reference (white) level is automatically adjusted to 240/255 regardless of the output values of the CCD 10 (101) itself, and any digital image data are multiplied by the gain determined under AGC. This method is convenient as long as the incident light quantity from the halogen lamp is always constant, without change, or the relation between the quantity of incident light and the CCD output is completely linear. However, if the light quantity of the halogen lamp 4 falls and/or if the linearity characteristics of the F-channel and the L-channel differ from each other, as illustrated in FIG. 2, then the reliability of regulation of digital output level under AGC is degraded. Disagreement in linearity characteristic between the F-channel and the L-channel also occurs in the image reader of the first embodiment, as illustrated in FIG. 7A.

Figure 7B:
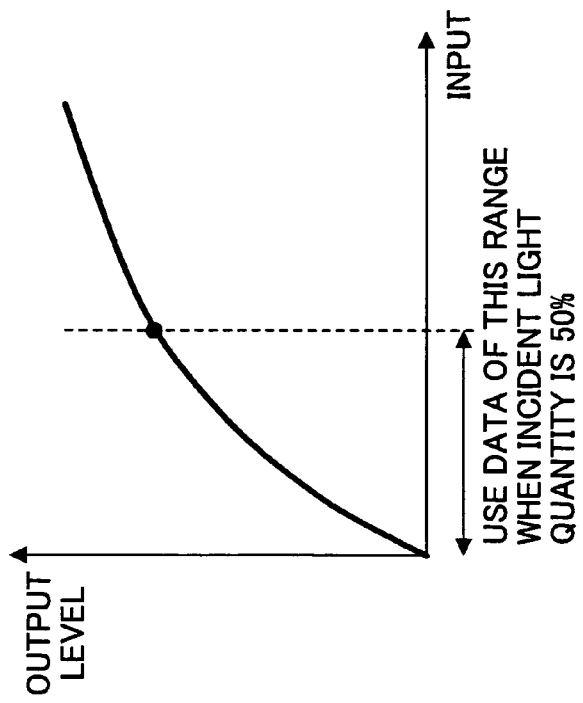
FIG. 7B is a graph illustrating an example of correction data used in a correction table.
Figure 7A:
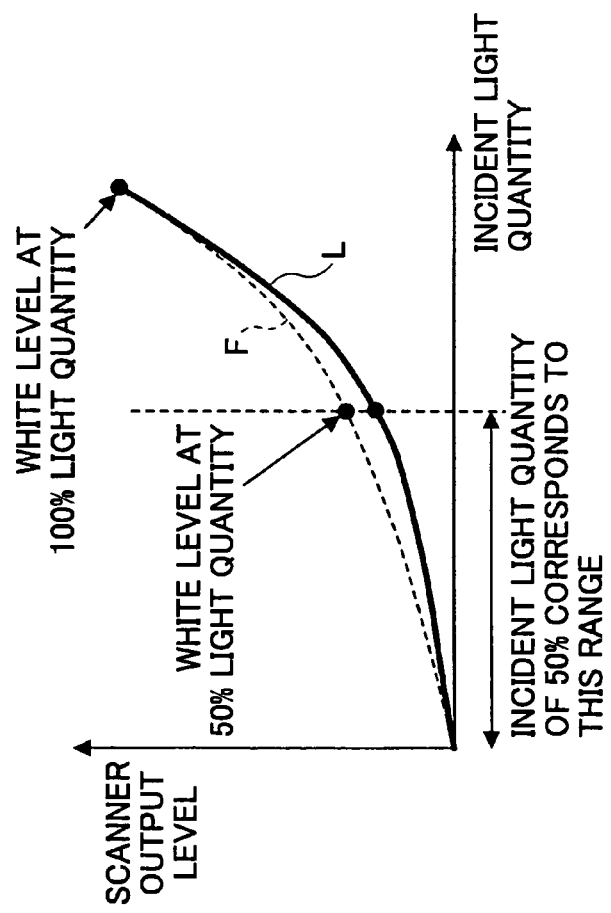
FIG. 7A is a graph showing an example of the difference between the F-channel output and the L-channel output.

For example, the F-channel and L-channel linearity characteristics shown in FIG. 7A are acquired under the factory default condition by reading gray scales at 100% light quantity of the halogen lamp 4 (without degradation or fall of light quantity). Based on these linearity characteristics, a gamma correction table having the characteristic shown in FIG. 7B is created in order to bring the L-channel linearity characteristic consistent with the F-channel linearity characteristic (i.e., the target linearity characteristic). Then, during market use of the image reader, the light quantity of the halogen lamp 4 may fall to half (50%). When the light quantity of the lamp becomes one half, the output level of the CCD also becomes ½. With the conventional image reader, the gain of the amplifier is adjusted to double using the AGC function so as to maintain the reference (white) level at 240/255, as in the initial state of 100% light quantity. As a result, the levels of all the analog pixel data are amplified uniformly to double. Furthermore, after A/D conversion and shading correction, gamma correction is performed on the uniformly amplified L-channel digital data using the gamma correction table created under the condition of 100% light quantity. A problem occurs at this stage of gamma correction.

If the CCD output level becomes half, gamma correction has to be performed using the range up to 50% incident light quantity in the gamma correction table created under the condition of 100% light quantity, as illustrated in FIG. 7B. However, due to double gain processing, fall of the incident light quantity is neglected, and consequently, correction data of the appropriate range cannot be used in the gamma correction table. As a result, the L-channel linearity characteristic cannot be brought into agreement with the F-channel linearity characteristic. This is because the white level at 50% light quantity is regarded as that at 100% light quantity due to the automatic and uniform amplification, and because gamma correction is performed using wrong data values.

To overcome this problem, in the first embodiment, the linearity characteristic is corrected through gamma correction using data values corresponding to those values before being subjected to amplification by the amplifier of the analog processing circuit 42. In other words, the digital image data values output from the A/D converter 44 are multiplied by the inverse of the gain of the amplifier, and linearity correction using the gamma correction table is performed on the multiplied data values.

Figure 8:
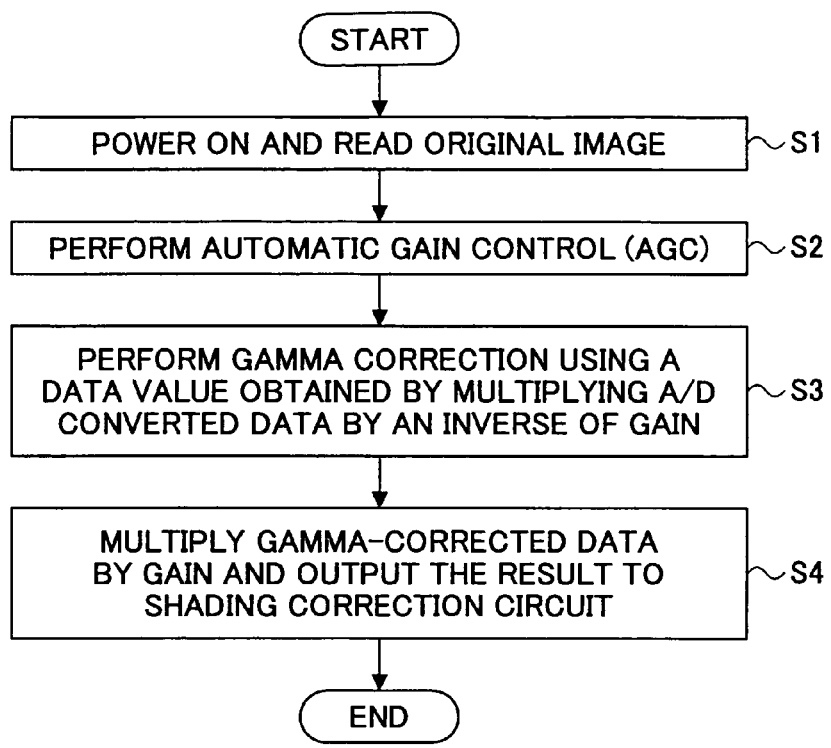
FIG. 8 is a flowchart illustrating an example of the image reading operation performed by the image reader of the first embodiment.

FIG. 8 is a flowchart of the operation carried out by the image reader of the first embodiment. The original is scanned upon power-on of the image reader (step S1). The analog image signals output from the CCD 10 on four channels FE, FO, LE, and LO are amplified to a prescribed level by the associated amplifiers, and then converted into digital image data by the associated A/D converters 43 and 44. At this time, the gains of the amplifiers of the analog processing circuit 41 and 42 are automatically adjusted by the arithmetic processing unit 47, based on the levels of the A/D converted digital image data (step S2). The gain determined for the amplifier of the L-channel analog processing circuit 42 is also supplied from the arithmetic processing unit 47 to the gamma correction table 48.

In step S3, the data values obtained by multiplying the digital image data output from the A/D converter 44 by the inverse of the gain of the associated amplifier (or by dividing the digital image data by the gain) are used as input data values on which gamma correction or linearity correction is to be performed in the gamma correction table 48. Gamma correction is performed on the multiplied data values based on the correction data with the characteristic shown in FIG. 7B (step S3). If the gain of the amplifier is double, then the digital image data values output from the A/D converter 44 are multiplied by ½. If the gain is 0.75, then the digital image data values are multiplied by ¾. Thus, gamma correction is performed at the gamma correction table 48 using the data values corresponding to the raw data values output from the CCD 10.

For example, if the incident light quantity on the CCD 10 is reduced to 50% due to fall of the light quantity of the halogen lamp 4, linearity correction is performed using correction data residing in the range below the dashed line shown in FIG. 7B. The correction using this range of correction data is appropriate one performed on data equivalent to the originally scanned data. In this manner, appropriate linearity correction is realized, taking into account the change in light quantity, while corresponding to the original output levels of the CCD 10.

The digital image data having been subjected to linearity correction at the gamma correction table 48 are supplied to the multiplier/divider circuit 49, at which multiplication or division based on the gain is performed (step S4). If the gain is 2, digital image data values are made half prior to gamma correction, and made double again at the multiplier/divider circuit 49 so as to be suitable for conversion processing corresponding to the actual gain. Thus, the appropriately corrected digital data are to be subjected to shading correction and the subsequent image processing.

Figure 9:
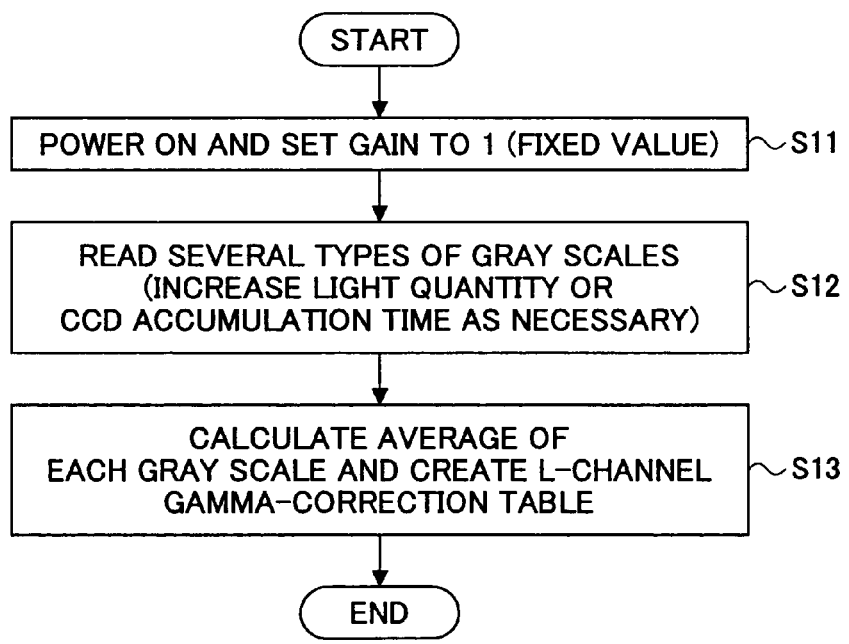
FIG. 9 is a flowchart illustrating an example of the correction table creating process.

FIG. 9 is a flowchart showing an example of a gamma table creating process applied to creation of the gamma creation table 48. Upon power-on, the gains of the amplifiers of the analog processing circuits 41 and 42 are set to a fixed value (step S11). In this example, the gains are set to 1. Using this gain, several gray scales with different reflectance values are scanned, and CCD output levels are acquired (step S12). Then, an average is calculated for each of the gray scales based on the scanning results, and a gamma correction table shown in FIG. 7B is created for each of the reflectance values (step S13). The created gamma correction table is used to bring the L-channel scanning values consistent with the FD-channel scanning values in the actual scanning operation. The gamma correction table 48 may be created by means of a table creating function under the control of the CPU. With the gamma correction table 48 created under the condition of gain 1, the level of the digital image data being subjected to gamma correction is the same as that of the analog image data before amplification, and therefore, appropriate correction can be realized under the same condition as that in the table creating process.

Since the signal level output from the CCD 10 is small, the CCD output is generally amplified under the automatic gain control (AGC). If gray scales are scanned with the gain set to 1 when creating the gamma correction table 48, the scanning result may not reach the full scale level, and the gamma correction table 48 may not be created. To overcome this problem, the light quantity of the lamp may be increased as shown in step S12 of the flowchart. (The lamp may be designed such that the light quantity can be increased from the initial state of the factory default, depending on the specification.) Alternatively, the charge accumulating time of the CCD 10 may be increased temporarily for the scanning of the gray scales. By either method, the light receiving quantity of the CCD 10 is increased so as to acquire full-scale image signals (corresponding to light quantity of 100%) even with the gain set to 1, and the gamma correction table with the correction data shown in FIG. 7B can be created.

In the first embodiment, the gamma correction table 48 and the multiplier/divider circuit 49 are inserted in the L-channel data path so as to bring the linearity characteristic of the L-channel image data consistent with the linearity characteristic of the F-channel image data. However, the gamma correction table 48 and the multiplier/divider circuit 49 may be inserted in the F-channel data path. In this case, the linearity characteristic of the L-channel data is used as the target linearity, and the linearity characteristic of the F-channel data is adjusted so as to be consistent with the target linearity. Alternatively, the combination of the gamma correction table 48 and the multiplier/divider circuit 49 may be inserted in both the L-channel and F-channel data paths. In this case, an ideal value of the target linearity is set in advance, and the linearity characteristics of the F-channel and L-channel image data are brought to the target value. Furthermore, the linearity characteristic of one of the four channels, for example, the first-part odd-pixel (FO) channel may be selected as the reference characteristic, and the correction means including the gamma correction table 48 and the multiplier/divider circuit 49 may be inserted in the other three channels.

Although not illustrated, the image reader of the first embodiment may be applied to a color image reader using a set of color CCDs (color image sensors). For example, the CCD arrays 10 shown in FIG. 5 are provided to the respective colors of red (R), green (G) and blue (B), and integrated in a sensor chip. In general, a halogen lamp or a xenon lamp is used in a color image reader, and fluctuation in light quantity of the blue (B) component is much greater that those of red (R) or green (G) components.

Figure 10:
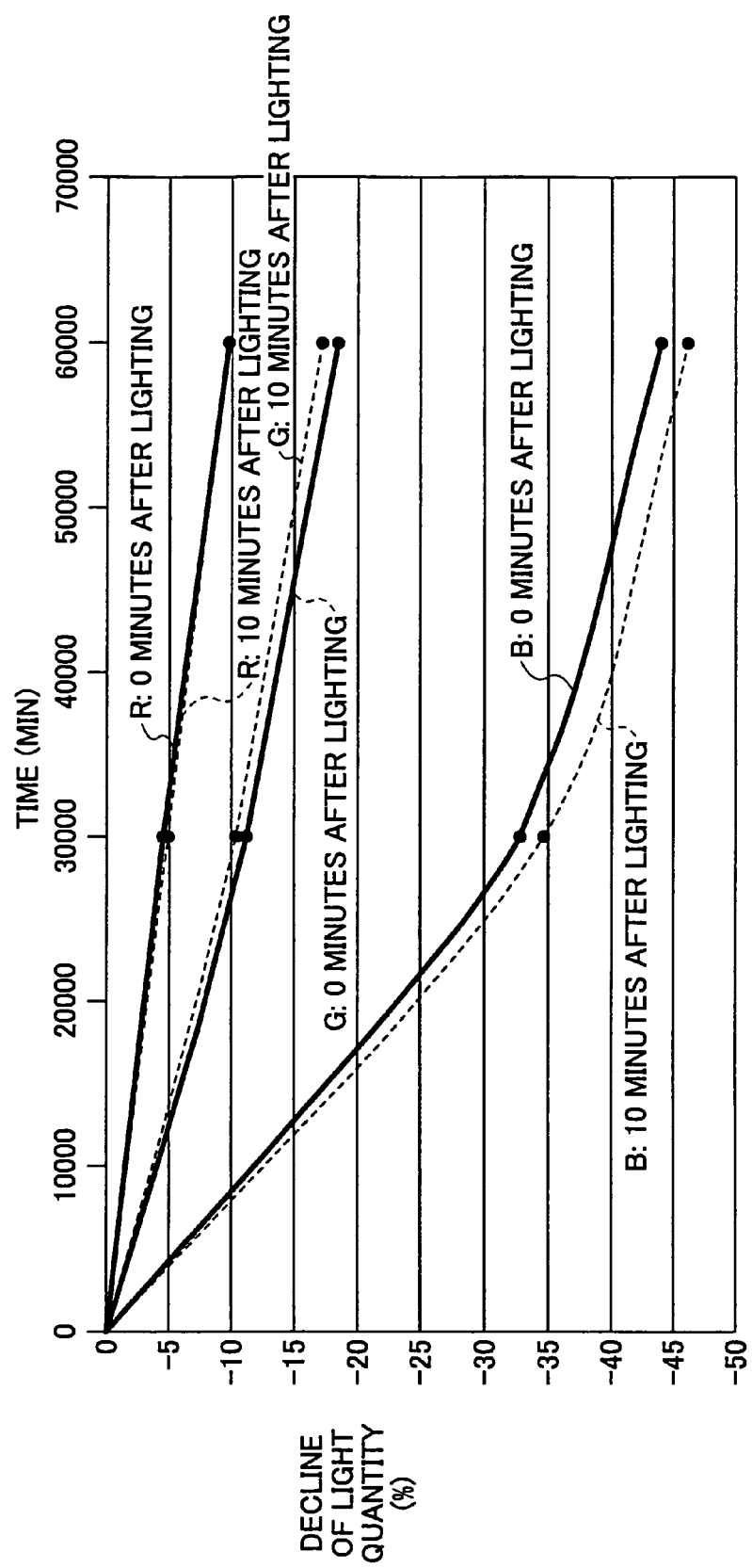
FIG. 10 is a diagram illustrating decline of the light quantity in each of the R, G, and B components when using a xenon lamp.

FIG. 10 is a chart showing decline of light quantity of each color component occurring when using a xenon lamp. The amount of decline in light quantity with respect to the initial light quantity is measured by detecting the CCD output level of each color component after 0 minutes and ten minutes from the lighting on and by calculating the average in the fast scan direction. When using this type of color CCD, the conventional linearity correction method cannot follow or deal with the degradation of light quantity, and inconsistency with the correction data in the correction table becomes much larger in the blue (B) component, as compared with the remaining colors. The level difference between the F-channel data and L-channel data varies among red (R), green (G) and blue (B), and the gray balance is degraded. This situation is much worse than the case in which the incident light quantity falls to substantially the same extent in R, G, and B. In this regard, the image reader of the first embodiment is capable of performing appropriate linearity correction, taking into account the fall of light quantity of the light source. Thus, the undesirable situation caused by the conventional method, in which the difference between the F-channel data and the L-channel data differ depending on the color components and the gray balance is degraded, can be avoided.

Figure 11:
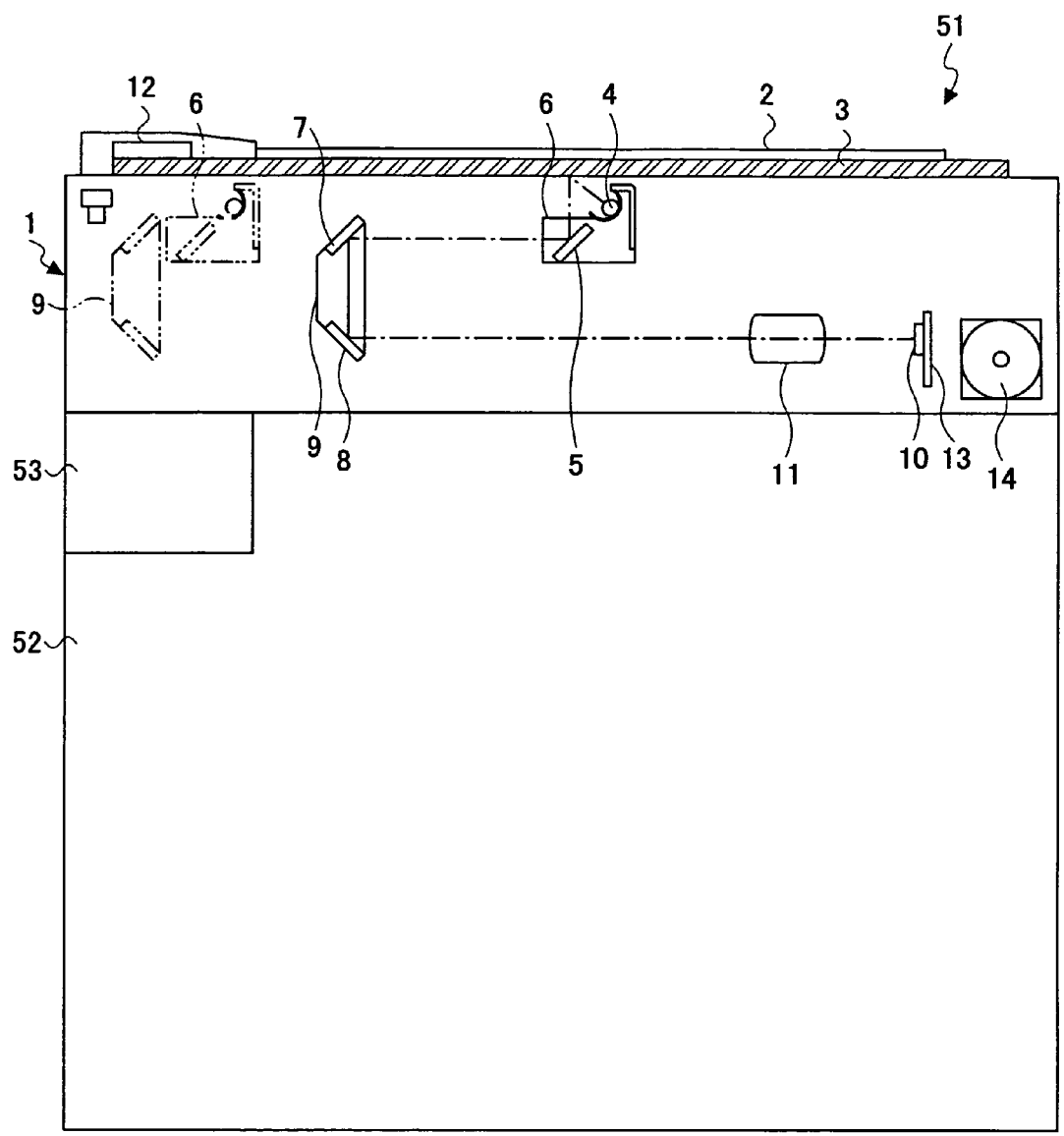
FIG. 11 is a schematic diagram illustrating an application of the image reader to a digital copier.

FIG. 11 is a schematic diagram of a digital copier 51 to which the image reader 1 of the first embodiment is applied. The image reader 1 may be used stand alone, but can also be applied to any type of image forming and reproducing apparatus, including the digital copier 51. In this example, the digital copier 51 includes the image reader 1, a printer engine 52, and a control unit 53 using a microcomputer for controlling the entire operation of the digital copier 51.

The image scanner 1 performs linearity correction on the A/D converted digital data equivalent to the raw data output from the CCD array, and performs other necessary image processing on the amplified digital data. The printer engine 52 reproduces an image on a recording medium (such as paper) using a known printing method, such as an electrophotographic method, an inkjet method, a sublimation-type thermal transfer method, a silver salt photographic method, a direct thermosensitive recording method, or a fusion-type thermal transfer method. The control unit 53 controls the image reader 1 so as to cause the image reader 1 to scan the original 2 and produce pixel data representing the image on the original 2. The control unit 53 then controls and causes the printer engine 52 to reproduce the image based on the pixel data generated by the image reader 1.

The second embodiment of the present invention is now described.

Figure 12:
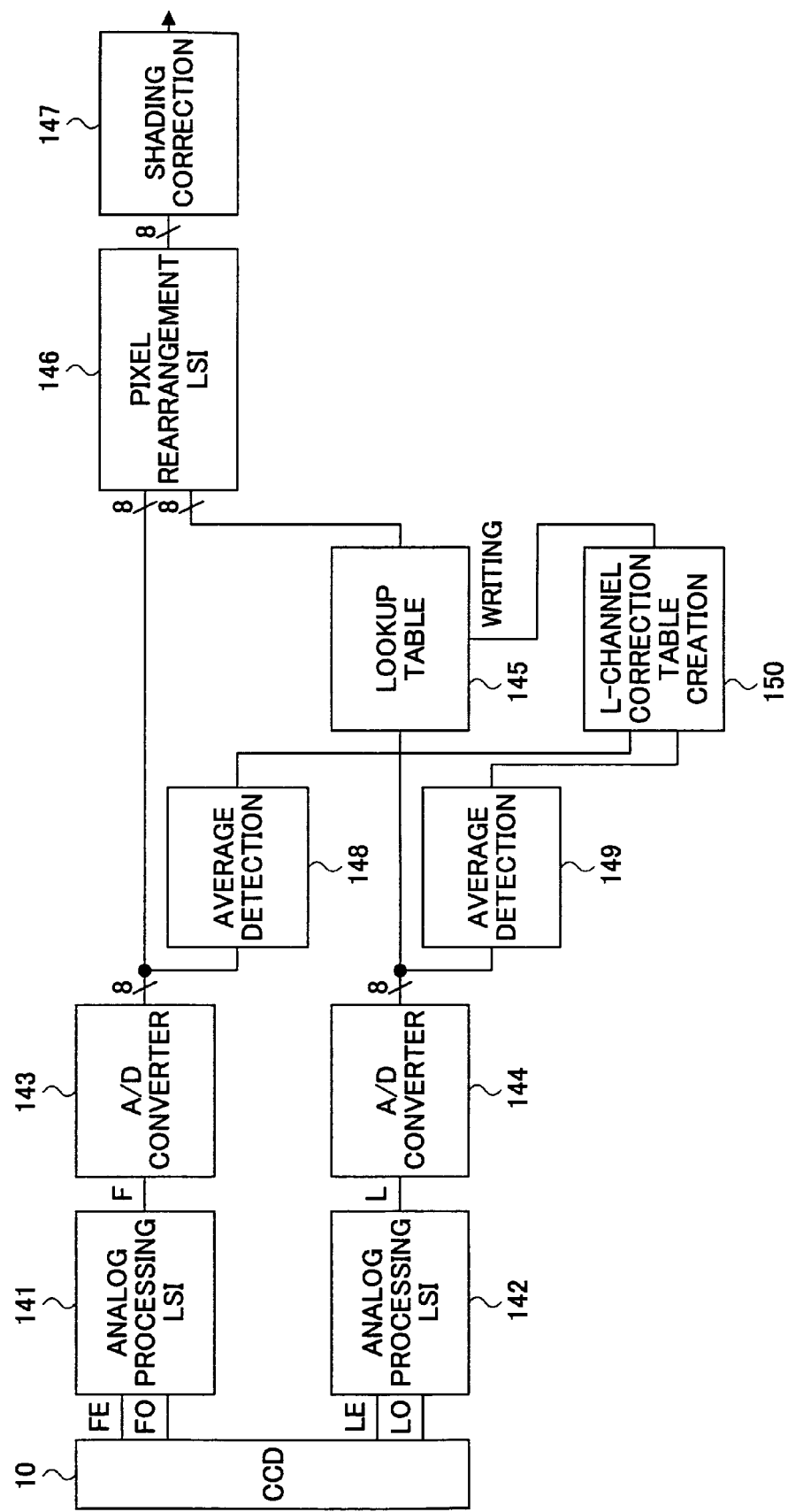
FIG. 12 is a block diagram illustrating a part of an image reader according to the second embodiment of the invention.

FIG. 12 is a block diagram illustrating a part of the image reader 1 according to the second embodiment of the invention. Although the circuit structure for performing linearity correction on the CCD output signals is different from that of the first embodiment, the mechanical structure of the image reader 1 is the same as that of the first embodiment illustrated in FIG. 4. The internal structure of the CCD 10 is also the same as that shown in FIG. 5. Accordingly, the light-to-electric converted analog signals produced at the CCD 10 are grouped into four, that is, the first-part odd-pixel group (FO), the first-part even-pixel group (FE), the last-part odd-pixel group (LO), and the last-part even-pixel group (LE), and output through four channels of data paths.

In FIG. 12, the CCD 10, which is 4-channel output image sensor, outputs analog pixel signals in parallel on FE, FO, LE, and LO channels. The FE channel and the FO channel are paired and input to the analog processing LSI circuit 141. The LE channel and the LO channel are paired and input to the analog processing LSI circuit 142. The analog pixel signal on each channel is amplified to a prescribed level by the amplifier provided in each of the analog processing circuits 141 and 142 under automatic gain control (AGC). Then, the even-pixel analog signals and the odd-pixel analog signals are combined and rearranged in a time-series signal sequence using a multiplexer or a suitable device in each of the first-part group and the last-part group. Other necessary signal processing is also performed at each of the analog processing circuits 141 and 142. Then, the first-part analog pixel signal sequence F and the last-part analog pixel signal sequence L are input to the analog-to-digital converters 143 and 144, respectively, and converted into digital pixel data.

On one of the F-channel and L-channel digital image data sets is performed linearity correction, using a lookup table 145 in which gamma correction data for bringing the linearity characteristic of the image data of one of the channels consistent with the linearity characteristic of the image data of the other channel are written. In this example, the lookup table 145 is inserted on the L-channel data path, and therefore, linearity correction is performed on the L-channel digital image data so as to bring the linearity characteristic of the L-channel consistent with that of the F-channel. After the correction, the digital image data items of the two channels are supplied to the pixel rearrangement LSI circuit 146, and combined into a time series signal sequence. Then, shading correction is performed on the time series signal sequence at the shading correction circuit 147, which circuit comprises a memory and arithmetic components for correcting the illuminance distribution and/or the sensitivity difference among pixels. The digital image signals are output from the image reader 1.

Although, in the example shown in FIG. 12, the lookup table 145 is inserted in the L-channel data path, it may be inserted in the F-channel data path, using the linearity characteristic of the L-channel data as the target linearity. Alternatively, the lookup table 145 may be inserted in both the L-channel and F-channel data paths, using an ideal value of the target linearity set in advance. Furthermore, the linearity characteristic of one of the four channels, for example, the first-part odd-pixel (FO) channel may be selected as the reference characteristic, and the lookup table 145 may be inserted in the other three channels.

In the second embodiment, a pair of average detection circuits 148 and 149, and a correction table creating circuit 150 are provided in the image reader 1. The average detection circuits 148 and 149 are connected to the outputs of the analog-to-digital (A/D) converters 143 and 144, respectively, to detect the output levels of the digital image data of these two channels independently. The correction table creating circuit 150 compares the output levels of the digital image data of the F-channel and L-channel, and creates a correction table for compensating for the output level difference between the F-channel and the L-channel, based on the comparison result. In this example, the correction table creating circuit 150 is designed so as to correct the characteristic of the L-channel digital image data. The image reader 1 of the second embodiment also has multiple gray charts (density charts) corresponding to different quantities of incident light, which charts are readable at any time.

The combination of the average detection circuits 148 and 149 and the correction table creating circuit 150 is inserted after the A/D converters 143 and 144. Each of the average detection circuits 148 and 149 receives digital image data acquired by scanning the multiple gray charts, and calculates the average of the output levels of a certain region of the digital image data supplied from the associated channel. The correction table creating circuit 150 creates a lookup table 145 based on the average levels of the two channels. Since the gray chart scanning method and the gamma correction method using the lookup table are known, explanation for them is omitted here.

Figure 13:
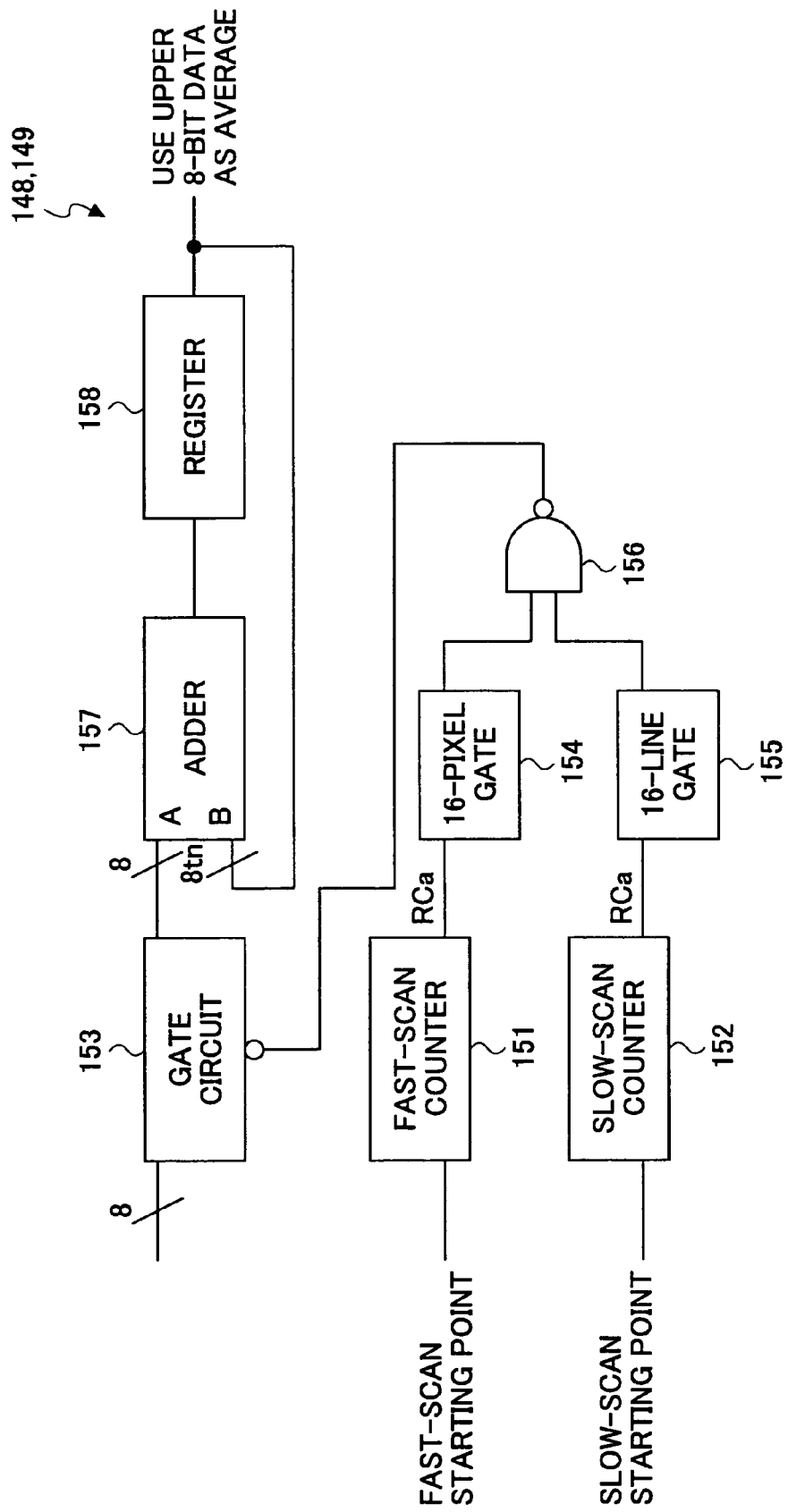
FIG. 13 is a block diagram illustrating the average detection circuit used in the image reader shown in FIG. 12.

FIG. 13 is a block diagram of the average detection circuit used in the image reader 1. Each of the average detection circuits 148 and 149 includes a fast-scan clock counter 151 for counting pixel clock signals to specify the pixel position of the image being scanned in the fast scan direction, a slow-scan line counter 152 for counting line clock signals to specify the line position of the image being scanned in the slow scan direction, and a gate circuit 153 for receiving 8-bit digital image data from one of the A/D converters 143 and 144. A 16-pixel gate circuit 154 is connected to the output of the fast scan counter 151, and a 16-line gate circuit 155 is connected to the output of the slow scan counter 152. The 16-pixel gate 154 and the 16-line gate 155 are provided to specify the scanning area for the gate circuit 153. An AND gate 156 produces a logical product of the outputs from the 16-pixel gate 154 and the 16-line gate 155.

The output of the gate circuit 153 is connected to an input of an adder 157, which successively adds up the 8-bit digital image data supplied from the gate circuit 153. A 16-bit flip-flop register 158 accumulates the addition results, and feeds the accumulated value back to the adder 157. The fast scan starting position and the slow scan starting position are supplied as the preset values from a register (not shown) to the fast scan clock counter 151 and the slow scan line counter 152, respectively. The fast scan starting position and the slow scan starting position are determined from the position information of the gray chart placed on the contact glass 3 (FIG. 4), from which the average level is detected.

In scanning the gray chart placed on the contact glass 3, when the scanning position reaches a designated gray chart, ripple-carry out signals RCa are output from the fast scan clock counter 151 and the slow scan line counter 152. The gate of the 16-pixel gate circuit 154 is open for the time period corresponding to 16 pixels, and the gate of the 16-line gate circuit 155 is open for the time period corresponding to 16 lines. Thus, a region of 16 pixels times 16 lines is defined by the AND gate 156. Eight-bit digital image data are supplied from the gate circuit 153 to the A-terminal (one of the input terminals) of the adder 157 during scanning of this region. The output of the adder 157 is connected to the input of the 16-bit register 158, and the output of the register 158 is input to the B-terminal of the adder 157 for the next addition. In this manner, the newly input 8-bit digital image data item is successively added up by repeating addition and accumulation until the register 158 accumulates 256 (16×16=256) pixel digital image data item of the designated region. The average of the digital image data of this region is the 8-bit-shifted addition result of the adder 157, truncating the decimals down to an integer average. (The upper 8 bits of the data accumulated in the register 158 becomes the average of the digital image data of the designated region.)

In this manner, the average is detected for each designated region for the F-channel data and the L-channel data, independently.

Based on the F-channel average and the L-channel average detected for each of the gray charts at the average detection circuits 48 and 49, respectively, the difference between the F-channel data and the L-channel data is calculated for each gray chart at the L-channel correction table creating circuit 150.

Based on the calculated difference, the L-channel correction table creating circuit 150 updates the lookup table 145 used to correct the different in output characteristics between the F-channel data and the L-channel data. Since the density values of the gray charts are discrete, the L-channel correction table creating circuit 150 interpolates the average values residing between two adjacent gray charts with adjacent densities, using an interpolation circuit (which is described below in conjunction with FIG. 14 and FIG. 15). Consequently, more detailed gamma correction values can be set in the lookup table 145 over the entire density range.

Figure 14:
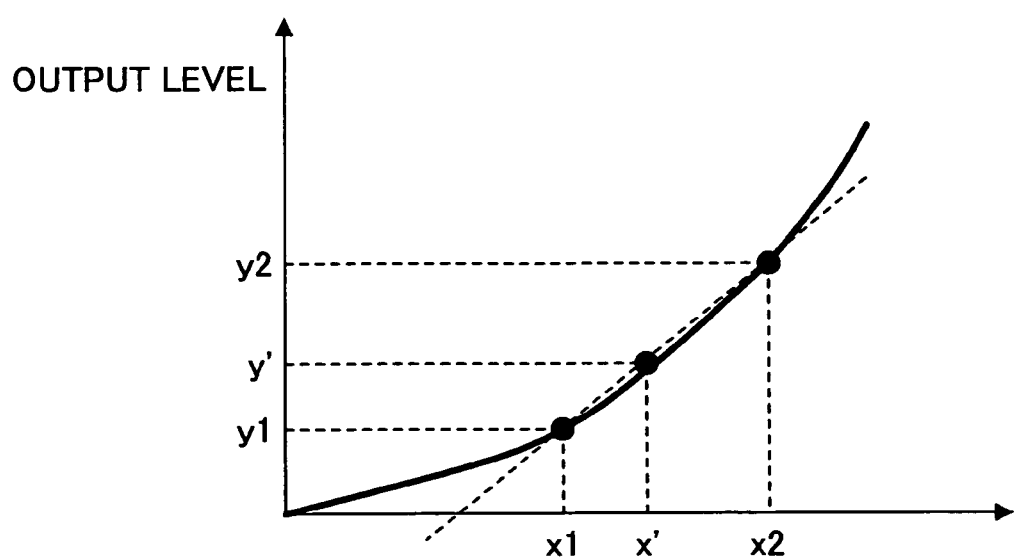
FIG. 14 is graph used to explain linear approximation between two data points.

Interpolation performed in the L-channel correction table creating circuit 150 is now explained. Typical examples of this type of interpolation method include a linear approximation between two data points and a (three-dimensional) spline method. First, linear approximation is explained in conjunction with FIG. 14. If the output characteristic is defined by output levels y1 and y2 determined as a function of reflectance x1 and x2, as illustrated in FIG. 14, the output level y' corresponding to an arbitrary point x' residing between x1 and x2 is calculated based on equation $$y'=y1+[(y2-y1)/(x2-x1)](x'-x1).$$

Applying this method to the second embodiment, y1 and y2 represent the average values obtained from the scanning data of two gray charts with adjacent density levels x1 and x2. An average value y' is then interpolated corresponding to a fictious gray scale chart x' whose density level is between x1 and x2.

Figure 15:
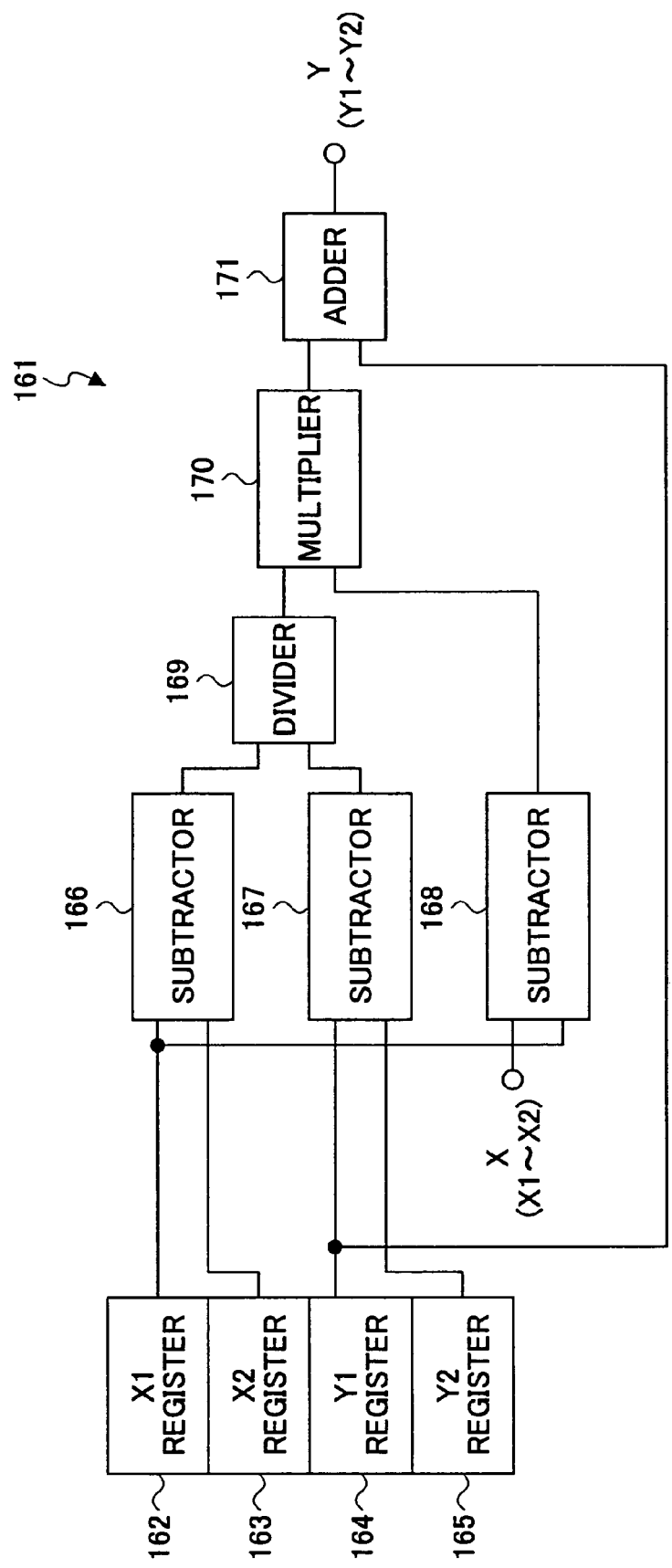
FIG. 15 is a block diagram illustrating the interpolating circuit for performing interpolation.

FIG. 15 is a block diagram of an interpolating circuit 161 performing the above-described linear interpolation. The interpolating circuit 161 has registers 162-165 for holding known values of x1, x2, y1 and y2, respectively. The interpolating circuit 161 also includes subtractor circuits 166-168, a divider circuit 169, a multiplier circuit 170, and an adder circuit 171, which perform operations according to the four fundamental rules of arithmetic. The subtractor circuits 166-168 perform subtractions between x1 and x2, between y1 and y2, and between x1 and unknown x, respectively. The divider circuit 169 performs division using the outputs from the subtractor circuits 166 and 167. A multiplier circuit 170 multiplies the division result from the divider circuit 169 by the subtraction result from the subtractor circuit 168. The adder circuit 171 adds y1 to the product output from the multiplier circuit 170. In this operation, subtraction is performed by adding "two's compliment plus 1" and canceling the most significant bit. Multiplication is performed by calculating logical products, while shifting bit by bit to the upper level, and summing them up. Division is performed by shifting the divisor to the upper level with respect to the dividend prior to subtraction, and by successively sifting to the lower level, while setting "0" if the result is negative, or setting "1" if the result is not negative. The interpolating circuit 161 shown in FIG. 15 can be realized by combination of adders, AND gates and bit shifters, at low cost with a simple structure.

Figure 16:
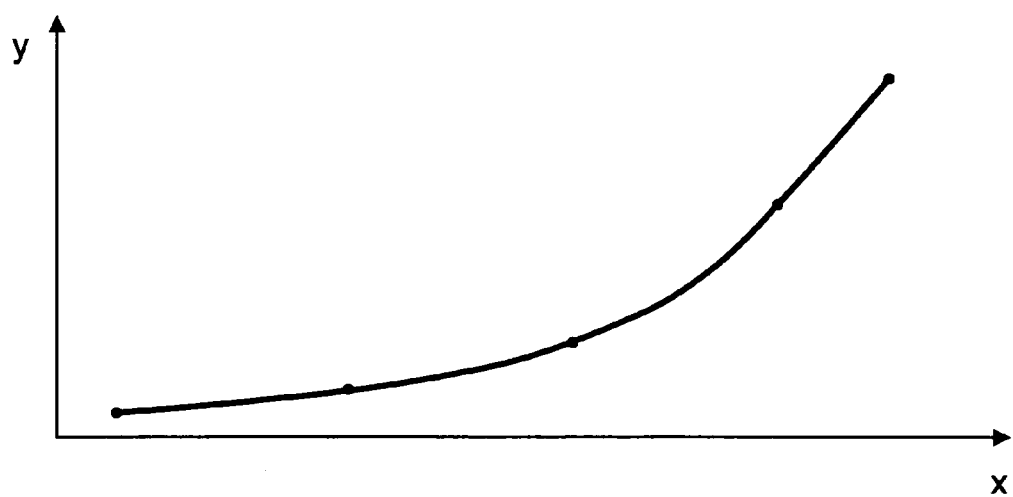
FIG. 16 is a graph used to explain a spline interpolation method.

Next, explanation is made of a (three-dimensional) spline method. FIG. 16 is a chart illustrating a characteristic curve of the (three-dimensional) spleen method for determining a y-value corresponding to an arbitrary x-value. With this method, the y-value is determined by performing four steps of operations.

Step 1:

Determine small section and stepsize for x coordinates $$h_i=x_{i+1}-x_i, i=0,\ldots,(n-1)$$

Calculate divisional difference of y coordinates $$b_i=2*(h_i+h_{i-1}), i=1,\ldots,(n-1)$$

$$d_i=3*[(y_{i+1}-y_i)/h_i-(y_i-y_{i-1})/h_{i-1}], i=1,\ldots,(n-1)$$

Step 2:

Forward elimination (Gaussian elimination)

$$g_1=h_1/b_1$$

$$g_i=h_i/(b_i-h_{i-1}*g_{i-1}), i=2,\ldots,(n-2)$$

$$u_1=d_1/b_1$$

$$u_i=(d_i-h_i*u_{i-1})/(b_i-h_{i-1}*g_{i-1}), i=2,\ldots,(n-2)$$

Step 3:
Backward elimination (Gaussian elimination)

$$r_{n-1}=u_{n-1}$$

$$r_i=u_i-g_i*r_{i+1}, i=(n-2),\ldots,1$$

$$r_0=0$$

$$r_n=0$$

Step 4:
Calculate each coefficient $$p_i=y_i$$

$$q_i=(y_{i+1}-y_i)/h_i-h_i*(r_{i+1}+2*r_i)/3$$

$$s_i=(r_{i+1}-r_i)/3*h_i$$

Calculate y-value $$y=p_i+q_i*(x-x_i)+r_i*(x-x_i)^2+s_i*(x-x_i)^3$$

In general, three-dimensional spline can achieve more satisfactory interpolation than linear approximation. If using a three-dimensional spline method in the interpolating circuit, the characteristic difference between the F-channel and the L-channel can be reduced more efficiently. Although the actual example of the interpolating circuit performing a three-dimensional spline method is not illustrated, it can also be realized by a combination of fundamental four rules of arithmetics.

By performing interpolation, the relation between the reflectance and the average output levels of the F-channel data and the L-channel data can be determined as a consecutive data set over the entire range of reflectance, as shown in Table 1. The gamma correction data written in the lookup table 145 to perform the target correction on the L-channel data are 8 bits by 8 bits. Then, a y-value is determined at a stepsize of 0.4% of the x-value, which is determined by dividing the whole range by 255 (100%/255). Table 2 is a table illustrating an example of correction data written in the gamma correction table (lookup table) 145 created under the condition of Table 1. The gamma correction table 145 has a simple data structure because the characteristic of the L-channel data is simply brought consistent with the characteristic of the F-channel data. As illustrated in Table 2, the input (memory address) value is an L-channel value, and the output (memory data) value is the F-channel value.

TABLE 1

| REFLECTANCE | F AVERAGE | L AVERAGE |
|---|---|---|
| 1 | 255 | 255 |
| \| | \| | \| |
| 0.904 | 226 | 223 |
| 0.9 | 225 | 222 |
| 0.896 | 224 | 221 |
| \| | \| | \| |
| 0.804 | 199 | 193 |
| 0.8 | 198 | 192 |
| 0.796 | 197 | 191 |
| \| | \| | \| |
| 0.104 | 32 | 31 |
| 0.1 | 31 | 30 |
| 0.0996 | 30 | 29 |
| \| | \| | \| |
| 0 | 0 | 0 |

TABLE 2

| IN | OUT | IN | OUT |
|---|---|---|---|
| 255 | 255 | 191 | 197 |
| \| | \| | \| | \| |
| 223 | 226 | 31 | 32 |
| 222 | 225 | 30 | 31 |
| 221 | 224 | 29 | 30 |
| \| | \| | \| | \| |
| 193 | 199 | 0 | 0 |
| 192 | 198 | | |

The image reader 1 of the second embodiment may be used as an independent image scanner, or alternatively, it may be applied to an arbitrary image forming and reproducing apparatus, such as the digital copier illustrated in FIG. 11. By applying the image reader 1 to the digital copier, a high-quality image can be reproduced or printed on a recording medium by sufficiently eliminating the inter-channel characteristic difference, with the boundary between the first part and the last part of the pixel array inconspicuous.

This patent application is based on and claims the benefit of the earlier filing date of Japanese Patent Application No. 2004-033632 filed Feb. 10, 2004, and NO. 2004-193776 filed Jun. 30, 2004, entire contents of which are hereby incorporated by reference.

The invention claimed is:

1. An image reader comprising:
an image sensor configured to receive a light beam reflected from an original to be read and output as an analog pixel signal corresponding to a light quantity of the received light beam;
a variable-gain amplifier configured to amplify the analog pixel signal to a prescribed level;
an analog-to-digital converter configured to convert the amplified analog pixel signal to digital image data; and
correction means for performing correction on the A/D converted digital image data according to a prescribed criterion, using a data value corresponding to an original level of the analog pixel signal before the amplification, wherein the correction according to the prescribed criterion is a linearity correction with reference to a target linearity characteristic.

2. The image reader of claim 1, wherein the correction means is configured to set the data value corresponding to the original level of the analog pixel signal before the amplification, based on a gain of the amplifier.

3. The image reader of claim 2, wherein the correction means is configured to set the data value corresponding to the original level of the analog pixel signal before the amplification by multiplying the A/D converted digital image data by the inverse of the gain of the amplifier.

4. The image reader of claim 1, wherein the correction means has a correction table for performing a linearity correction.

5. The image reader of claim 4, wherein the correction means further has converting means arranged after the correction table and performing a conversion process corresponding to the gain of the amplifier on the linearity-corrected digital image data.

6. The image reader of claim 4, further comprising a correction table creating circuit configured to acquire pixel data from the image sensor obtained by scanning a gray scale with a fixed gain of the amplifier and create the correction table by calculating correction data based on the acquired gray scale pixel data and a target linearity characteristic.

7. The image reader of claim 6, wherein the gain of the amplifier is set to 1 when scanning the gray scale.

8. The image reader of claim 7, wherein a light-receiving quantity of the image sensor is increased when scanning the gray scale.

9. The image reader of claim 8, wherein the light-receiving quantity of the image sensor is increased by increasing light quantity of the light beam.

10. The image reader of claim 8, wherein the light-receiving quantity of the image sensor is increased by increasing a charge accumulation time of the image sensor.

11. The image reader of claim 1, wherein the image sensor divides analog pixel outputs into a first-part pixel group and a last-part pixel group in a fast scan direction, and outputs the analog pixel signal groups in different channels, wherein one of the amplifiers is provided for each of the analog pixel groups.

12. The image reader of claim 11, wherein the image sensor further divides each of the first-part pixel group and the last-part pixel group into an odd-pixel group and an even-pixel group, and outputs the odd-pixel group analog pixel signal and the even-pixel group analog pixel signal alternately to the associated amplifiers.

13. The image reader of claim 1, wherein the image sensor is a color image sensor having a sensor unit provided for each of red (R), green (G), and blue (B).

14. The image sensor of claim 1, wherein the image sensor divides analog pixel outputs into a first-part pixel group and a last-part pixel group in a fast scan direction, and outputs the analog pixel signal groups in different channels, wherein the correction means is configured to perform the correction so as to bring a first linearity characteristic of one of the channels into agreement with a second linearity characteristic of the other channel.

15. The image sensor of claim 1, wherein the image sensor divides analog pixel outputs into a first-part pixel group and a last-part pixel group in a fast scan direction, and outputs the analog pixel signal groups in different channels, wherein the correction means is configured to perform the correction so as to bring linearity characteristics of the different channels into agreement with a target linearity characteristic.

16. An image forming and reproducing apparatus comprising:
   an image reader configured to read an image from an original; and
   a printing unit configured to reproduce the image read by the image reader on a recording medium, wherein the image reader includes:
      an image sensor configured to receive a light beam reflected from an original to be read and output as an analog pixel signal corresponding to a light quantity of the received light beam;
      a variable-gain amplifier configured to amplify the analog pixel signal to a prescribed level;
      an analog-to-digital converter configured to convert the amplified analog pixel signal to digital image data; and
      correction means for performing correction on the A/D converted digital image data according to a prescribed criterion, using a data value corresponding to an original level of the analog pixel signal before the amplification,
   wherein the correction according to the prescribed criterion is a linearity correction with reference to a target linearity characteristic.

17. An image reading method comprising the steps of:
   receiving a light beam reflected from an original to be read at an image sensor and outputting an analog pixel signal corresponding to a light quantity of the received light beam;
   amplifying the analog pixel signal to a prescribed level using a variable-gain amplifier;
   converting the amplified analog pixel signal to digital image data; and
   performing correction on the A/D converted digital image data according to a prescribed criterion, using a data value corresponding to an original level of the analog pixel signal before the amplification,
   wherein the correction performed according to the prescribed criterion is a linearity correction with reference to a target linearity characteristic.

18. The method of claim 17, wherein the correction step includes setting the data value corresponding to the original level of the analog pixel signal before the amplification, based on a gain of the amplification.

19. The method of claim 18, wherein the correction step includes setting the data value corresponding to the original level of the analog pixel signal before the amplification by multiplying the A/D converted digital image data by the inverse of the gain of the amplifier.

20. The method of claim 17, wherein the correction step includes using a correction table for performing a linearity correction on the A/D converted digital image data.

21. The method of claim 20, further comprising the step of:
   performing conversion on the linearity-corrected digital image data, the conversion corresponding to the amplification performed on the analog pixel signal.

22. The method of claim 17, further comprising the steps of:
   dividing analog pixel outputs generated at the image sensor into a first-part pixel group and a last-part pixel group in a fast scan direction;
   outputting the analog pixel signal groups from the image sensor in different channels; and
   amplifying each of the output analog pixel groups.

23. The method of claim 22, further comprising the steps of:
   dividing each of the first-part pixel group and the last-part pixel group into an odd-pixel group and an even-pixel group; and
   outputting the odd-pixel group analog pixel signal and the even-pixel group analog pixel signal alternately to the associated amplifiers.

24. The method of claim 17, further comprising the steps of:
   dividing analog pixel outputs generated at the image sensor into a first-part pixel group and a last-part pixel group in a fast scan direction;
   outputting the analog pixel signal groups in different channels; and
   performing the correction so as to bring a first linearity characteristic of one of the channels into agreement with a second linearity characteristic of the other channel.

25. The method of claim 17, further comprising the steps of:
   dividing analog pixel outputs generated at the image sensor into a first-part pixel group and a last-part pixel group in a fast scan direction;
   outputting the analog pixel signal groups in different channels; and performing the correction so as to bring linearity characteristics of the different channels into agreement with a target linearity characteristic.

26. An image reader comprising:
an image sensor configured to receive a light beam reflected from an original, divide analog pixel outputs generated based on a light-receiving quantity into a first-part analog pixel signal and a last-part analog pixel signal in a scan direction, and output the first-part analog pixel signal and the last-part analog pixel signal in first and second channels, respectively;
an analog-to-digital converter provided to each of the first-part analog pixel signal and the last-part analog pixel signal and configured to convert the analog pixel signal to digital image data;
a digital output level detection circuit configured to detect an output level of the digital image data of each of the first and second channels;
a table creating circuit configured to compare the detected output level of the first channel with the output level of the second channel and create a correction table for correcting for an output level difference between the first and second channels based on the comparison result; and
a pixel rearrangement circuit configured to rearrange the digital image data of the first and second channels having been subjected to correction using the correction table into a time series signal sequence.

27. The image reader of claim 26, wherein the digital output level detection circuit detects an average output level of a certain region of the digital image data read from the original.

28. The image reader of claim 26, further comprising:
a plurality of density charts corresponding to different incident light quantities, the density charts being arranged so as to be scanned any time;
wherein the digital output level detection circuit detects the output levels of the digital image data of the density charts, and the table creating circuit creates the correction table based on the detected output levels of the density charts.

29. The image reader of claim 28, wherein the table creating circuit has an interpolating circuit configured to interpolate an output level between two density charts with adjacent density levels based on the detected digital output level of the density charts.

30. The image reader of claim 29, wherein the interpolating circuit interpolates the output level between the two adjacent density charts by linear approximation.

31. The image reader of claim 29, wherein the interpolating circuit interpolates the output level between the two adjacent density charts by a spline method.

32. The image reader of claim 26, wherein the image sensor divides each of the first-part analog pixel signal and the last-part analog pixel signal into an odd-pixel group signal and an even-pixel group signal, and output the odd-pixel group signal and the even-pixel group signal alternately.

33. An image forming and reproducing apparatus comprising:
an image reader configured to read an image from an original; and
a printing unit configured to reproduce the image read by the image reader on a recording medium, wherein the image reader comprises:
an image sensor configured to receive a light beam reflected from an original, divide analog pixel outputs generated based on light-receiving quantity into a first-part analog pixel signal and a last-part analog pixel signal in a scan direction, and output the first-part analog pixel signal and the last-part analog pixel signal in first and second channels, respectively;
an analog-to-digital converter provided to each of the first-part analog pixel signal and the last-part analog pixel signal and configured to convert the analog pixel signal to digital image data;
a digital output level detection circuit configured to detect an output level of the digital image data of each of the first and second channels;
a table creating circuit configured to compare the detected output level of the first channel with the output level of the second channel and create a correction table for correcting for an output level difference between the first and second channels based on the comparison result; and
a pixel rearrangement circuit configured to rearrange the digital image data of the first and second channels having been subjected to correction using the correction table into a time series signal sequence.

* * * * *